(12) United States Patent
Umemoto et al.

(10) Patent No.: US 6,693,690 B2
(45) Date of Patent: Feb. 17, 2004

(54) REFLECTIVE LIQUID-CRYSTAL DISPLAY DEVICE

(75) Inventors: Seiji Umemoto, Ibaraki (JP); Yuuki Nakano, Ibaraki (JP); Ryoji Kinoshita, Ibaraki (JP); Hiroaki Kishioka, Ibaraki (JP); Waka Sakaitani, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/135,438

(22) Filed: May 1, 2002

(65) Prior Publication Data

US 2002/0180910 A1 Dec. 5, 2002

(30) Foreign Application Priority Data

May 7, 2001 (JP) ....................... P2001-135873

(51) Int. Cl.[7] ............................................ G02F 1/1335
(52) U.S. Cl. ...................... 349/113; 349/65; 349/62; 349/63; 362/31
(58) Field of Search ............................ 349/113, 65, 62, 349/63; 362/31

(56) References Cited

U.S. PATENT DOCUMENTS

2002/0005922 A1   1/2002   Umemoto et al.

FOREIGN PATENT DOCUMENTS

| JP | 2000-147499 | 5/2000 |
| JP | 2000-162594 | 6/2000 |

*Primary Examiner*—Tarifur Chowdhury
*Assistant Examiner*—George Y. Wang
(74) *Attorney, Agent, or Firm*—Sughrue Mion, PLLC

(57) ABSTRACT

A lightweight, touch-input-type reflective liquid-crystal display panel having a reflective liquid-crystal display panel. The reflective liquid-crystal display panel being formed in a manner such that external light incident on an outer surface is reflected by the light-reflecting layer so that display light transmitted through the liquid-crystal layer is made to emerge from the visual side cell substrate and viewed.

23 Claims, 4 Drawing Sheets

REFLECTIVE LIQUID-CRYSTAL DISPLAY DEVICE

The present application is based on Japanese Patent Application No. 2001-135873, which is incorporated herein by reference.

BACKGROUND OF THE INVENTION

1. Field of the Invention

The present invention relates to a touch input type reflective liquid-crystal display device thin, lightweight and excellent in display quality.

2. Description of the Related Art

As a related-art reflective liquid-crystal display device having a reflective liquid-crystal display panel, a light source, and an input position detecting touch panel provided on a visual side of the reflective liquid-crystal display panel through the light source, there is know as a reflective liquid-crystal display device in which a side light type light pipe used as a light source is used integrally with a pressure-receiving side base material of a touch panel, the pressure-receiving side base material being formed to have diffusing type light output means by mixing diffusing particles or by printing a diffusing material (unexamined Japanese Patent Publication No. 2000-162594).

Such a reflective liquid-crystal display device using a front light system and having a light source disposed on the visual side is used in a mobile apparatus such as a portable telephone set or a portable personal computer. According to the reflective liquid-crystal display device, emergent light of the light incident on a side surface of the light pipe is reversed by a reflecting layer so that display light obtained thus is viewed through the light pipe and the touch panel. Accordingly, a total reflection type reflecting layer can be used and reflectance can be made high. Hence, the reflective liquid-crystal display device using the front light system has an advantage in that a display image can be made bright compared with a semi-transmissive liquid-crystal display device using a backlight unit and a half mirror.

In the related-art touch input type reflective liquid-crystal display device, there is however a problem that the thickness of the side light type light pipe required for light transmission is so large that the thickness and weight of the liquid-crystal display device become large, and that display through the touch panel may be viewed as if it were present deep in the liquid-crystal display device. Further, there has been another problem that interfacial refection of external light is produced in an air layer interposed between the lower surface of the light pipe and the front surface of the liquid-crystal display panel to thereby lower the contrast of the liquid-crystal display, and that luminance in the viewing direction is low because of shortage of display light made to emerge in a perpendicular direction by the diffusing type light output means.

Further, there have been a problem that failure is easily produced in the touch panel, particularly in a transparent electrode of the touch panel, to thereby result in a short lifetime of the touch panel, and a problem that a display image formed by the reflective liquid-crystal display device is disordered by light-diffusing dots to thereby result in lowering of resolution due to image blurs. The reason why the failure is easily produced in the former problem is conceived as follows. That is, when a pressed position is detected by electrical conduction generated by pressure contact between transparent electrodes disposed so as to face each other through input side and pressure-receiving side base materials, the transparent electrodes are easily damaged and degraded by a concavo-convex structure of the diffusing type light output means given to the pressure-receiving side base material.

As the light output means, there has been known light output means which are formed into a prism structure constituted by prism-like concavo-convex portions disposed in the form of stripes at regular intervals. Even in the light output means having a prism structure, however, stress is concentrated on the apices of prisms in the light output means at the time of inputting because the transparent electrode is also formed to have prism-like concavo-convex portions. In such a manner, the prism structure is easily damaged, so that there arises a problem that the transparent electrode is easily cracked and peeled off to thereby make the life of the touch panel shorter. Further, when the prism structure is broken, the broken structure generates abnormal points of light emission from the light pipe. Accordingly, light leakage toward the visual side is increased so that display quality is considerably lowered. Dust generated and deposited due to the broken structure produces abnormal emission points to thereby cause remarkable lowering of display quality.

SUMMARY OF THE INVENTION

An object of the present invention is to develop a touch input type reflective liquid-crystal display device using a front light system in which light incident on a side surface is made to emerge efficiently from the display device with good perpendicular directivity so that the display device is bright in display, free from disorder of a display image, excellent in display quality, long in life, thin in thickness and light in weight.

According to the invention, there is provided a reflective liquid-crystal display device having a reflective liquid-crystal display panel, at least one light source, an optical path control layer, a transparent touch panel, and a transparent adhesive layer in the following configuration. That is, the reflective liquid-crystal display panel includes a liquid-crystal cell, and light-reflecting means. The liquid-crystal cell has a back-side cell substrate made of a support substrate containing at least an electrode, a visual-side cell substrate made of a transparent substrate containing at least a transparent electrode, and a layer of liquid crystal between the two cell substrates disposed so that the electrode sides of the two cell substrates face each other. The light-reflecting means is located on the back side with respect to the liquid-crystal layer of the cell. The reflective liquid-crystal display panel is formed in a manner such that external light incident on an outer surface of the visual-side cell substrate is reflected by the light-reflecting means so that display light transmitted through the liquid-crystal layer is made to emerge from the visual-side cell substrate and viewed. The light source is disposed on at least one of side surfaces of the reflective liquid-crystal display panel. The optical path control layer has a thickness in a range of from 10 to 300 $\mu$m and is disposed on an outer surface side of the visual-side cell substrate. The transparent touch panel is provided with a mechanism for detecting an input portion and bonded to an outer side of the optical path control layer through the transparent adhesive layer. The optical path control layer includes light output means formed by arrangement of a plurality of fine grooves each made of a concave portion shaped like an approximate triangle in section. Each of the fine grooves has a length of not larger than 250 $\mu$m and a depth of not larger than 50 $\mu$m, the depth being not larger than $\frac{1}{5}$ as large as the length. Each of the fine grooves has an optical path changing slope, and a steep slope facing the optical path changing slope. The optical path changing slopes is provided so that light incident on the side surface from the light source is reflected toward the back-side cell substrate side. Each of the optical path changing slopes is inclined at an inclination angle in a range of from 35 to 48 degrees to a reference plane of the liquid-crystal display panel. Each of the steep slopes is inclined at an inclination angle of not lower than 60 degrees to the reference plane.

According to the invention, there can be formed a front light mechanism in which the optical path of incident light from the light source disposed on a side surface of the liquid-crystal display panel is changed efficiently in the viewing direction of the liquid-crystal display panel through the light output means of the optical path control layer disposed on the visual side and through the light-reflecting means disposed on the back side, so that the light can be utilized for the liquid-crystal display, and in which incident external light in an external light mode can be used for the liquid-crystal display. There can be also formed a reflective liquid-crystal display device thin in thickness, light in weight and excellent in display quality in an external light-illumination double mode by use of the thin optical path control layer and the light source disposed on the side surface.

Further, on basis of the fact that the light output means are constituted by fine grooves, advantages can be generated as follows. First, moiré due to the interference of the light output means with the arranged pixels hardly occurs, so that the presence of the light output means becomes inconspicuous. Second, the display image is hardly disordered, so that resolution becomes excellent. Third, stress is hardly concentrated on the transparent electrodes in input operation, so that failure is hardly generated in the touch panel and the life of the touch panel becomes long. Fourth, interfacial reflection between the touch panel and the liquid-crystal display panel hardly occurs, so that lowering of the contrast can be prevented.

Features and advantages of the invention will be evident from the following detailed description of the preferred embodiments described in conjunction with the attached drawings.

DETAILED DESCRIPTION OF THE PREFERRED EMBODIMENTS

The reflective liquid-crystal display device according to the invention includes a reflective liquid-crystal display panel, at least one light source, an optical path control layer, a transparent touch panel, and a transparent adhesive layer in the following configuration. That is, the reflective liquid-crystal display panel includes a liquid-crystal cell, and light-reflecting means. The liquid-crystal cell has a back-side cell substrate made of a support substrate containing at least an electrode, a visual-side cell substrate made of a transparent substrate containing at least a transparent electrode, and a layer of liquid crystal between the two cell substrates disposed so that the electrode sides of the two cell substrates face each other. The light-reflecting means is located on the back side with respect to the liquid-crystal layer of the cell. The reflective liquid-crystal display panel is formed in a manner such that external light incident on an outer surface of the visual-side cell substrate is reflected by the light-reflecting means so that display light transmitted through the liquid-crystal layer is made to emerge from the visual-side cell substrate and viewed. The light source is disposed on at least one of side surfaces of the reflective liquid-crystal display panel. The optical path control layer has a thickness in a range of from 10 to 300 $\mu$m and is disposed on an outer surface side of the visual-side cell substrate. The transparent touch panel is provided with a mechanism for detecting an input portion and bonded to an outer side of the optical path control layer through the transparent adhesive layer. The optical path control layer includes light output means formed by arrangement of a plurality of fine grooves each made of a concave portion shaped like an approximate triangle in section. Each of the fine grooves has a length of not larger than 250 $\mu$m and a depth of not larger than 50 $\mu$m, the depth being not larger than $\frac{1}{5}$ as large as the length. Each of the fine grooves has an optical path changing slope, and a steep slope facing the optical path changing slope. The optical path changing slopes is provided so that light incident on the side surface from the light source is reflected toward the back-side cell substrate side. Each of the optical path changing slopes is inclined at an inclination angle in a range of from 35 to 48 degrees to a reference plane of the liquid-crystal display panel. Each of the steep slopes is inclined at an inclination angle of not lower than 60 degrees to the reference plane.

Figure 1:
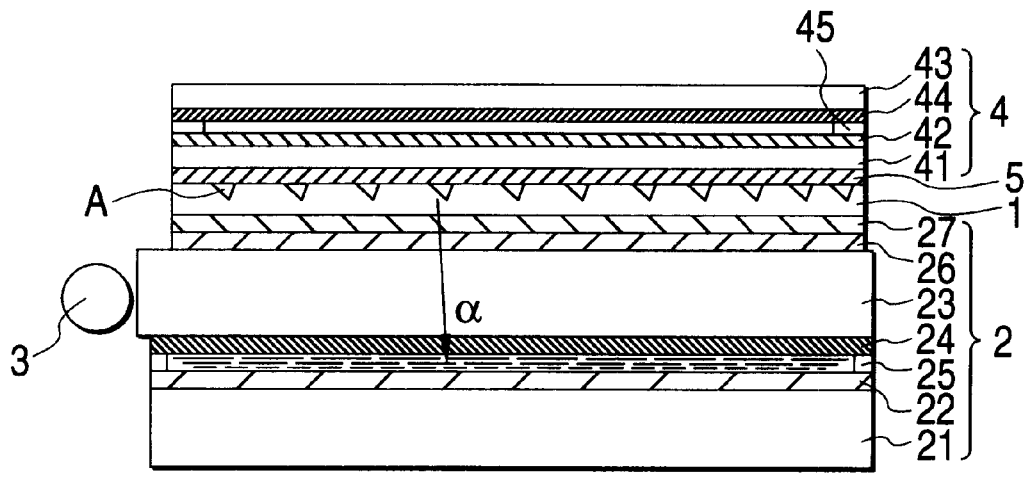
FIG. 1 is a side view for explaining an example of a reflective liquid-crystal display device.

FIG. 1 shows an example of the reflective liquid-crystal display device. The reflective liquid-crystal display device includes an optical path control layer 1 having light output means constituted by fine grooves A respectively, a liquid-crystal display panel 2 having a light source 3, a touch panel 4, and an adhesive layer 5. Incidentally, in FIG. 1, a back-side cell substrate includes a support substrate 21 provided with an electrode 22 serving also as light-reflecting means, while a visual-side cell substrate includes a transparent substrate 23 provided with a transparent electrode 24. The reference numeral 25 designates a liquid-crystal layer.

Any suitable reflective liquid-crystal display panel can be used as the liquid-crystal display panel without any particular limitation on kind. As shown in FIG. 1, an example of the suitable reflective liquid-crystal display panel at least includes a liquid-crystal cell, and light-reflecting means in the following configuration. That is, the liquid-crystal cell has a back-side cell substrate, a visual-side cell substrate, and a layer of liquid crystal. The back-side cell substrate includes a support substrate provided with at least an electrode formed on the support substrate. The visual-side cell substrate includes a transparent substrate provided with at least a transparent electrode formed on the transparent substrate. The liquid crystal layer is sandwiched between the back-side cell substrate and the visual-side cell substrate while the two cell substrates are disposed so that the respective electrodes of the two cell substrates face each other. The light-reflecting means is located on the back surface side of the cell relative to the liquid-crystal layer. External light incident on the outer surface of the visual-side cell substrate is reflected by the light-reflecting means, reversed in traveling course, and transmitted through the liquid-crystal layer, so that display light obtained thus is made to emerge from the visual-side cell substrate so as to be viewed.

Specific examples of the liquid-crystal cell on the basis of the aligning format of liquid crystal include: a twisted or non-twisted liquid-crystal cell such as a TN liquid-crystal cell, an STN liquid-crystal cell, a vertically aligned cell, an HAN cell or an OCB cell; a guest-host liquid-crystal cell; a ferroelectric liquid-crystal cell; and a liquid-crystal cell using light diffusing. In addition, the system for driving the liquid crystal is not particularly limited. For example, there may be used a suitable drive system such as an active matrix system or a passive matrix system. The liquid crystal is generally driven through the electrodes 22 and 24 arranged in the inner sides of the pair of the cell substrates 21 and 23 as shown in FIG. 1.

A transparent substrate is used as the visual-side cell substrate in order to allow the display light to be transmitted through the visual-side cell substrate. The transparent substrate can be made of any suitable material such as glass or a resin. Especially, the transparent substrate may be preferably made of an optically isotropic material from the point of view of suppressing birefringence as sufficiently as possible to reduce light loss. Further, a material excellent in colorlessness and transparency, such as a non-alkali glass plate as against a blue glass plate, is preferably used from the point of view of improvement in luminance or display quality. Further, a resin substrate is preferably used from the point of view of reduction in weight.

On one hand, any optional substrate such as a colored substrate may be used as the support substrate 21 in the back-side cell substrate when for example, the electrode 22 serving also as light-reflecting means is provided inside the liquid-crystal cell as shown in FIG. 1, because the support substrate need not be light-transmissive. On this occasion, when the liquid-crystal cell is of the type in which display is achieved on the basis of scattering of light or transmission/absorption difference, a black substrate may be preferably used from the point of view of black display. On the other hand, a transparent substrate may be used as the back-side cell substrate when the back-side cell substrate needs to be light-transmissive in the case where light-reflecting means is provided on the outer side of the liquid-crystal cell or when light from the light source disposed on a side surface is made incident on the back-side cell substrate, especially on the support substrate of the back-side cell substrate. The material of the transparent substrate may be used in accordance with the description of the visual-side cell substrate.

The thickness of each of the transparent substrate in the visual-side cell substrate and the support substrate in the back-side cell substrate may be determined suitably in accordance with enclosure strength of liquid crystal without any particular limitation. Generally, from the point of view of balance between transmission efficiency of light incident on the side surface and reduction in thickness and weight, the thickness is preferably selected to be in a range of from 10 $\mu$m to 5 mm, especially in a range of from 50 $\mu$m to 3 mm, further especially in a range of from 100 $\mu$m to 2 mm. As shown in FIG. 1, when the visual-side cell substrate is used as a substrate for transmitting incident light from the light source 3, it is preferable from the point of view of efficiency of incidence and efficiency of transmission that the sectional area and, accordingly, the thickness of the transparent substrate 23 are made as large as possible. Therefore, the thickness of the transparent substrate may be equal to or different from the thickness of the support substrate.

In the method in which the transparent substrate on the visual side is made thicker than the support substrate on the back side as described above, light incident on the side surface of the visual-side transparent substrate can be made so intensive that display light can be made brighter compared with the method in which the transparent substrate on the visual side is made equal in thickness to the support substrate on the back side. As a result, the rigidity of the visual-side cell substrate easily receiving pressure can be enhanced to prevent the disorder of the display image from being caused by the flexure of the cell substrate due to external force. Accordingly, it is possible to form the liquid-crystal display device which can be hardly cracked even in the case where the total thickness of the substrates is selected to be equal to that in the method in which the substrates are equal in thickness to each other.

Further, the visual-side cell substrate and the back-side cell substrate may be equal to each other in plane size or may be different from each other in plane size. When the visual-side cell substrate is used as a substrate for transmitting incident light from the light source, it is preferable that a side surface formed by the visual-side cell substrate 23 protrudes more outward than a side surface formed by the back-side cell substrate 21, at least in terms of a side surface on which the light source 3 is disposed as shown in FIG. 1. This protrusion state is preferable from the point of view of efficiency of incidence in the case where the light source is disposed on the protruded side surface.

The transparent electrode provided on the transparent substrate in the visual-side cell substrate or the transparent electrode provided on the support substrate in the back-side cell substrate as occasion demands may be made of any suitable material in accordance with the related art such as ITO. On the other hand, as shown in FIG. 1, the electrode 22 provided to serve also as light-reflecting means on the support substrate 21 in the back-side cell substrate as occasion demands may be made of any suitable reflective metal and preferably provided as a thin film of a high reflectance and good electrically conductive metal such as aluminum. On this occasion, when the visual-side cell substrate is provided as a substrate for transmitting incident light from the light source, the electrode 22 may be provided as a scatter light-reflecting means so that light transmitted through the visual-side cell substrate can hardly reach the light-reflecting means to thereby be prevented from being disordered due to scatter reflection until the transmitted light is reflected by the optical path changing slopes of the optical path control layer.

As described above, the light-reflecting means provided on the back side of the liquid-crystal cell relative to the liquid-crystal layer, that is, the light-reflecting means generally provided on the inner or outer side of the back-side cell substrate, is provided for the purpose of obtaining display light both in an illumination mode and in an external light mode in the following manner. Incident light from the light source 3 or transmitted light thereof is reflected by the optical path changing slopes of the fine grooves A constituting the light output means in the optical path control layer 1, so that the optical path of the light is changed toward the back-side cell substrate side. The light-reflecting means reflects and reverses the light $\alpha$ to thereby obtain display light in an illumination mode. On the other hand, the light-reflecting means reflects and reverses incident external light given through other portions than the fine grooves in the optical path control layer to thereby obtain display light in an external light mode. In this manner, the light-reflecting means can be applied to a reflective liquid-crystal display device which can be used both in an external light mode and in an illumination mode.

Any suitable light-reflecting means formed in accordance with the related art such as a white sheet can be used as the light-reflecting means, particularly as the light-reflecting means provided on the outer side of the liquid-crystal cell. Especially, a high-reflectance light-reflecting means may be used preferably. Examples of the high-reflectance light-reflecting means include: a coating layer containing powder of a high-reflectance metal such as aluminum, silver, gold, copper or chromium or powder of an alloy of the high-reflectance metal dispersed in a binder resin; a layer of the metal or a layer of a dielectric multilayer film formed by a suitable thin film forming method such as a vacuum vapor deposition method or a sputtering method; a reflecting sheet having the coating or deposited layer supported by a base material such as a film; and a sheet of metal foil.

The light-reflecting means to be formed may exhibit a light-scattering function as described above. When reflected light is diffused by the scatter refection surface of the light-reflecting means, the frontal directivity of the light can be improved. Further, when the surface of the light-reflecting means is roughened, occurrence of Newton's rings due to tight contact can be prevented so that visibility can be improved. Accordingly, the light-reflecting means located on the outer side of the cell may be formed in such a state that the light-reflecting means is simply laid over the cell, or in such a state that the light-reflecting means is disposed in close contact with the cell by a bonding method or by a vapor disposition method.

The formation of the scatter type light-reflecting means can be made by a method, for example, including the steps of: forming a surface of a film base material as a fine concavo-convex structure by a suitable method such as a surface roughening method using sandblasting, matting, or the like, or a particle adding method; and providing a light-reflecting means on the film base material so that the fine concavo-convex structure is mirrored in the light-reflecting means. The light-reflecting means having such a fine concavo-convex structure formed by mirroring the fine concavo-convex structure on the surface of the film base material can be formed by a method such as a method in which a metal is attached onto a surface of the film base material by a suitable vapor deposition or plating method such as a vacuum vapor deposition method, an ion-plating method or a sputtering method.

When the liquid-crystal cell is formed, one or two or more suitable functional layers such as an oriented film composed of a film subjected to rubbing for orienting liquid crystal, a color filter for color display and a low-refractive-index transparent layer may be provided as occasion demands. Incidentally, such oriented films are generally formed on the electrodes 22 and 24 respectively so as to come into contact with the liquid crystal. Such a color filter is generally provided between one of the support substrate 21 and the transparent substrate 23 in the cell substrates and corresponding one of the transparent electrodes. Accordingly, when the color filter is disposed on the support substrate, the electrode on the support substrate is provided as a transparent electrode.

On the other hand, the low-refractive-index transparent layer is provided for improving uniformity of brightness on the whole display screen in an illumination mode. Incidentally, as shown in FIG. 1, the transparent layer having a refractive index lower than that of the transparent substrate is provided between the transparent substrate 23 and the transparent electrode 24 in the visual-side cell substrate so that, when incident light from the light source 3 is transmitted through the visual-side cell substrate, the transmitted light can be totally reflected on the basis of the refractive index difference between the transparent substrate and the transparent layer. Accordingly, the light can be confined in the visual-side cell substrate efficiently and transmitted backward efficiently, so that the transmitted light can be supplied uniformly to the optical path changing slopes of the optical path control layer even in positions far from the light source. As a result, uniformity of brightness on the whole display screen can be improved on the basis of change of the optical path of the light through reflection.

Further, when the low-refractive-index transparent layer is provided on the visual-side cell substrate, the low-refractive-index transparent layer is effective as follows. That is, the low-refractive-index transparent layer is effective in preventing reduction or unevenness in the transmitted light due to partial variation in the transmission state of the light generated when the transmitted light is made incident on the liquid-crystal layer 25 and subjected to birefringence and scattering, and accordingly the low-refractive-index transparent layer can prevent display from becoming dark. Further, the low-refractive-index transparent layer is effective in preventing deterioration of display quality from being caused by ghosting of display near the light source in the back side. Further, when the color filter or the like is disposed, the low-refractive-index transparent layer is effective in preventing rapid absorption of light transmitted through the color filter to thereby avoid reduction in the transmitted light. If incident light from the light source is transmitted through the liquid-crystal layer, the transmitted light is scattered by the liquid-crystal layer to form an uneven transmission state to bring unevenness or ghosting of emergent light to make a display image difficult to view. In short, a structure in which the low-refractive-index transparent layer is provided on the visual-side cell substrate while the light source is disposed on the side surface of the visual-side cell substrate is used preferably from the point of view of brightness and display quality.

The low-refractive-index transparent layer may be made of a suitable material such as an inorganic or organic low-refractive-index dielectric having a low refractive index lower than that of the transparent substrate which is one of constituent members of the visual-side or back-side cell substrate. The low-refractive-index transparent layer can be formed by a suitable method such as a vacuum vapor deposition method or a spin coating method. The material and method for forming the low-refractive-index transparent layer are not particularly limited. From the point of view of achieving efficiency of backward transmission through total reflection as described above, the refractive index difference between the transparent layer and the transparent substrate is preferably selected to be as large as possible. It is preferable that the refractive index difference is especially not smaller than 0.05, further especially in a range of from 0.1 to 0.5. If the refractive index difference is in the preferred range, the difference has little influence on display quality in an external light mode. Incidentally, when the refractive index difference is 0.1, the reflectance of external light in the interface between the transparent substrate and the transparent layer is not larger than 0.1% and lowering in brightness or contrast due to reflection loss is extremely small.

The position of arrangement of the low-refractive-index transparent layer can be determined suitably. The low-refractive-index transparent layer is preferably located between the transparent substrate and the transparent electrode in order to attain the transmitted light confinement effect and to prevent the transmitted light from entering the liquid-crystal layer. When a color filter is disposed between the transparent substrate and the transparent electrode, the low-refractive-index transparent layer is preferably located nearer the transparent substrate than the color filter in order to prevent absorption loss of the transmitted light from being caused by the color filter. Therefore, the low-refractive-index transparent layer is generally provided directly on the transparent substrate. On this occasion, it is preferable that the surface of the transparent substrate to which the transparent layer is attached is as smooth as possible. That is, as the transparent layer is smoother, the transparent layer is more favorable for prevention of the transmitted light from being scattered, and more favorable for prevention of the scattered light from having influence on the display light. The thickness of the low-refractive-index transparent layer is preferably selected to be not smaller than 100 nm, especially not smaller than 200 nm, further especially in a range of from 400 nm to 5 μm, from the point of view of the confinement effect and reduction in the thickness.

As shown in FIG. 1, in the liquid-crystal display panel, the crystal cell may be additionally provided with one or two or more suitable optical layers such as a polarizer 27, a phase retarder 26 and a light-diffusing layer. The polarizer is provided for attaining display using linearly polarized light, for example, on a TN or STN liquid-crystal display panel. The phase retarder is provided for improving display quality by compensating for the retardation caused by the birefringence of the liquid crystal. The light-diffusing layer is provided for enlarging the display range by diffusing display light, for achieving uniformity of luminance by leveling bright-line-like emission through the optical path changing slopes of the optical path control layer, and for increasing the quantity of light incident on the optical path control layer by diffusing light transmitted through the liquid-crystal display panel. Therefore, the light-diffusing layer is generally provided between the optical path control layer and the transparent substrate in the visual-side cell substrate.

The polarizer may be arranged on each of opposite outer sides of the liquid-crystal cell or may be arranged on one of opposite outer sides of the liquid-crystal cell as shown in FIG. 1. As the polarizer, it is possible to use a suitable one without any specific limitation. From the point of view to obtain display with a good contrast ratio by use of the incidence of highly linearly polarized light, a polarizer with a high degree of polarization can be used preferably. Examples of the material of the polarizer include: an absorptive type polarizing film formed in such a manner that iodine or a dichromatic substance such as dichromatic dye is adsorbed to a hydrophilic polymer film such as a polyvinyl alcohol film, a partially formalized polyvinyl alcohol film or a partially saponified ethylene-vinyl acetate copolymer film and that the film is drawn; and an absorptive type polarizing film defined above and having one transparent protective layer provided on one or each of opposite sides of the absorptive type polarizing film.

The formation of the transparent protective layer is preferably performed by use of a material excellent in transparency, mechanical strength, thermal stability and moisture sealability. Examples of the material include: polymers such as acetate resin, polyester resin, polyether-sulfone resin, polycarbonate resin, polyamide resin, polyimide resin, polyolefin resin, acrylic resin, polyether resin, polyvinyl chloride resin, styrene resin and norbornene resin; and heat-curable or ultraviolet-curable resin such as acrylic resin, urethane resin, acrylic-urethane resin, epoxy resin and silicone resin. The transparent protective layer may be attached by a method such as a bonding method using the form of a film or a coating method using the form of a polymer solution.

On the other hand, as the phase retarder, it is possible to use a suitable material such as a birefringent film obtained in such a manner that a film formed from a suitable polymer, for example, as listed in the description of the transparent protective layer is drawn by a suitable method such as a uniaxal or biaxial drawing method, an oriented film of a suitable liquid-crystal polymer such as a nematic or discotic liquid-crystal polymer, or an oriented film having an oriented layer supported by a transparent base material. The refractive index of the phase retarder in the direction of the thickness thereof may be controlled under the action of heat-shrinking force of a heat-shrinkable film. The compensating phase retarder is generally disposed between the visual-side or/and back-side polarizers and the liquid-crystal cell in accordance with the necessity. As the phase retarder, it is possible to use a suitable one in accordance with the wavelength range. In addition, the phase retarder may be used in the form of two or more layers superposed on each other in order to control optical characteristic such as a retardation.

The light source disposed on the side surface of the liquid-crystal display panel is provided so that light utilized as illumination light for the reflective liquid-crystal display device is made incident on the side surface of the liquid-crystal display panel. Thus, the reflective liquid-crystal display device can be made thin and lightweight when the light source is used in combination with the optical path control layer disposed on the visual side of the panel. The preferred method for arranging the light source from the point of view to prevent incident light from the light source from entering the liquid-crystal layer is a method in which the light source is disposed on the side surface of the visual-side cell substrate, particularly on the side surface of the visual-side cell substrate protruded more greatly than the side surface of the back-side cell substrate, as described above.

As the light source, it is possible to use a suitable one. Preferred examples of the light source include: a linear light source such as a (cold or hot) cathode tube; a point light source such as a light-emitting diode; an array in which such point light sources are set in a linear or planar array; and a combination of a point light source and a linear light pipe through which incident light from the point light source is converted into light of a linear light source. The light source or light sources may be disposed on one or two or more side surfaces of the liquid-crystal display panel. When light sources are disposed on two or more side surfaces, the plurality of side surfaces may be constituted by a combination of opposite side surfaces, by a combination of side surfaces intersecting crosswise vertically and horizontally or by a combination of three or more side surfaces in use of both the aforementioned combinations.

Turning on the light source allows visibility in an illumination mode. Because it is unnecessary to turn on the light source when visibility is made in an external light mode, the light source is set to be changeable between turning on and turning off. As the change-over method, it is possible to use any desirable one. Any related-art method may be used as the change-over method. Incidentally, the light source may be of a multi-color light emission system that can switch its own emission color. Alternatively, different colors of light may be emitted through different kinds of light sources.

In accordance with necessity, the light source may be formed as a combined body in which a suitable assisting unit such as a reflector is disposed to surround the light source in order to guide divergent light from the light source to the side surface of the liquid-crystal display panel. As the reflector, it is possible to use a suitable reflecting sheet which reflects light at least on the light source side, such as a resin sheet provided with a high-reflectance metal thin film, a white sheet or a sheet of metal foil. The reflector may be used as a retention unit also having a function of surrounding the light source in such a manner that end portions of the reflector are bonded to end portions of upper and lower surfaces of a cell substrate of the liquid-crystal display panel, particularly to end portions of upper and lower surfaces of the visual-side cell substrate.

The optical path control layer is disposed on the outer surface of the visual-side cell substrate of the liquid-crystal display panel and generally on the visual side surface of the liquid-crystal display panel 2 as shown in FIG. 1. The optical path control layer is provided for the following purpose. That is, the optical path of incident light from the light source 3 disposed on the side surface of the liquid-crystal display panel as shown in FIG. 1 or transmitted light thereof is changed toward the back-side cell substrate of the panel by the optical path changing slopes of the fine grooves A constituting the light output means. The light is reflected and reversed by the light-reflecting means 22, so that the reflected light is used as illumination light (display light).

In order to achieve this purpose, as shown in FIG. 1, the optical path control layer 1 includes light output means constituted by fine grooves A which are formed in one of opposite surfaces, particularly in the upper surface (visual side) of the optical path control layer 1. Each of the fine grooves A has an optical path changing slope inclined at an inclination angle of from 35 to 48 degrees to the reference plane of the liquid-crystal display panel, that is, to the reference plane (virtual horizontal plane) of the visual-side cell substrate, so that incident light from the light source is reflected and so that the optical path of the reflected light is changed in a predetermined direction.

In the description, if the size of each of the fine grooves constituting the light output means is large, the fine grooves are apt to be conspicuous. As a result, a display image is disordered, so that display quality of the liquid-crystal display device is considerably lowered. Moreover, the density of the fine grooves arranged in the upper surface of the optical path control layer, that is, the number of the fine grooves per unit area of the upper surface of the optical path control layer is reduced, so that illumination for pixels is apt to become uneven. As a result, emission points are apt to be conspicuous because of such sparse light emission, so that visibility of the display image is reduced greatly. Increase in the number of the fine grooves to be arranged is effective in preventing this problem. In this case, reduction in size of the fine grooves is favorable. Particularly when the area used for arranging the light output means is limited, reduction in size of the fine grooves is an effective method to ensure uniformity of light emission.

Figure 4:
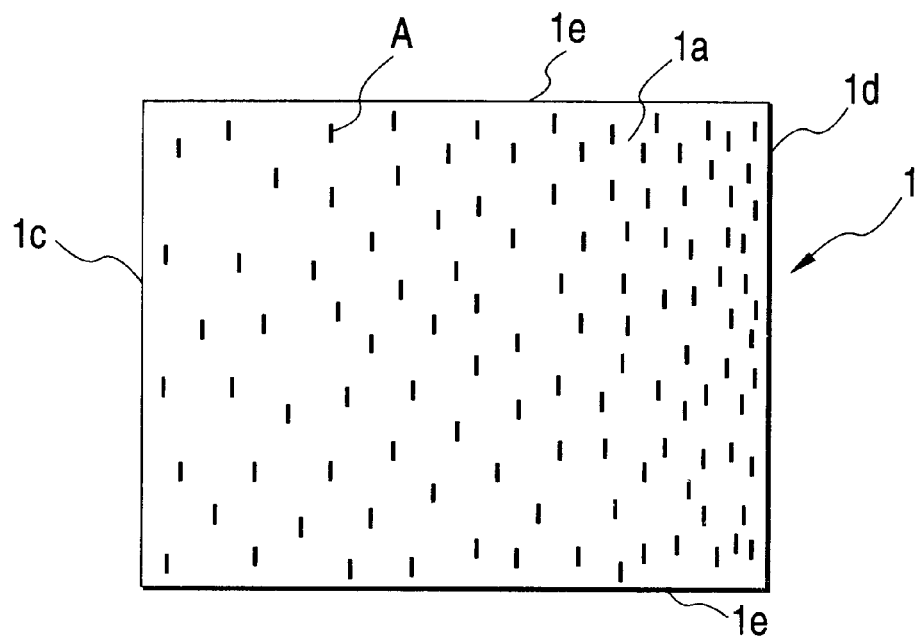
FIG. 4 is a plan view for explaining an example of arrangement of fine grooves.
Figure 5:
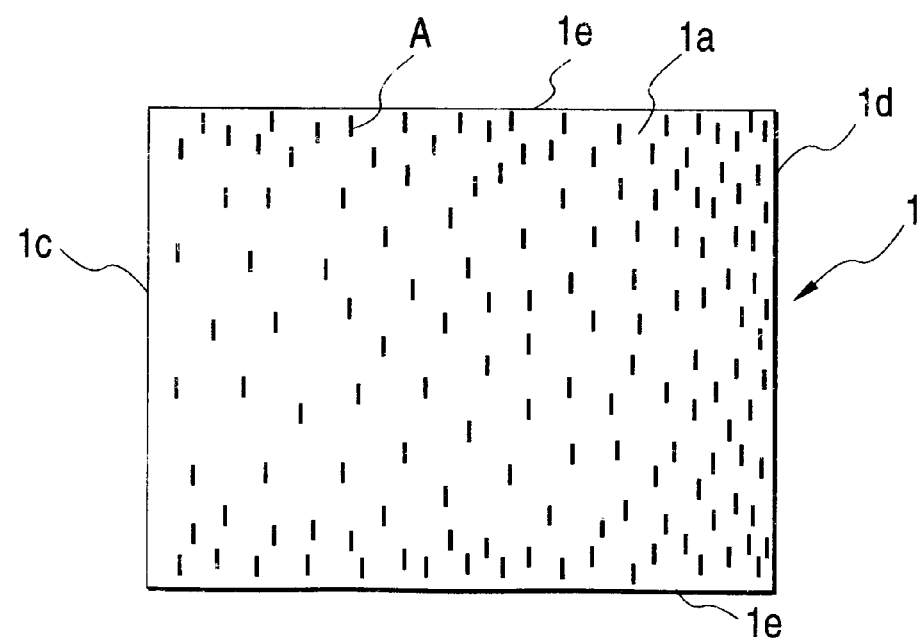
FIG. 5 is a plan view for explaining another example of arrangement of fine grooves.
Figure 6:
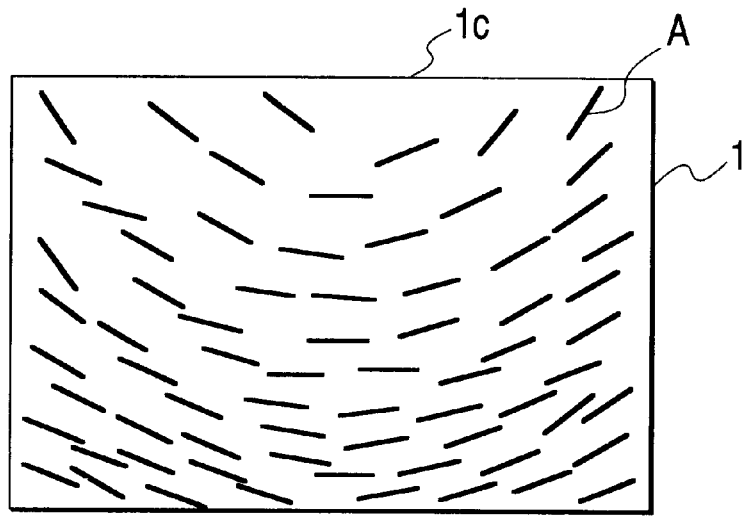
FIG. 6 is a plan view for explaining a further example of arrangement of fine grooves.

Accordingly, the light output means are formed to be inconspicuous to the observer and provided for improving the quality of the display image on the liquid-crystal display device through the touch panel. As shown in FIGS. 4 to 6, the light output means are constituted by fine grooves A each made of a concave portion shaped like an approximate triangle in section. Each of the fine grooves A has a length of not larger than 250 $\mu$m, especially not larger than 150 $\mu$m, further especially not larger than 100 $\mu$m, and a depth of not larger than 50 $\mu$m, especially not larger than 20 $\mu$m, further especially not larger than 15 $\mu$m, the depth being not larger than 1/5 as large as the length. The term "approximate" in the approximate triangle means that a change of each side such as curving of each side or rounding of each intersection point between every two sides is allowed.

There is no specific limitation in lower limit size of the fine grooves. The phenomenon of diffraction of light is, however, dominated to make refection or total reflection difficult if the fine grooves are too fine. Moreover, the number of the light output means to be arranged is so large that production efficiency is lowered. In addition, light-utilizing efficiency is apt to be lowered because an adhesive layer enters the fine grooves constituting the light output means when the optical path control layer is bonded to the touch panel through the adhesive layer. Form these points of view, it is preferable that each of the fine grooves is made to have a length of not smaller than 10 $\mu$m and a depth of not smaller than 2 $\mu$m.

When the depth of each of the fine grooves is selected to be not larger than 1/5 as large as the length thereof as described above, transmitted light can be reflected by the optical path changing slopes effectively so that light incident on the side surface can be made to emerge from the lower surface efficiently. If the depth of each of the fine grooves is larger than the length thereof, that is, if the length of each of the fine grooves is shorter than the depth thereof, the probability that transmitted light will be made incident on the optical path changing slopes decreases and the probability that the light will be made incident on side surfaces of the fine grooves increases. As a result, the ratio of scattered transmitted light increases and light-utilizing efficiency is lowered. From the point of view of the efficiency, it is preferable that the depth of each of the fine grooves is selected to be not larger than 1/8, especially not larger than 1/10 as large as the length thereof. Incidentally, the length of each of the fine grooves is based on the length of each of the long sides of the optical path changing slopes whereas the depth of each of the fine grooves is based on the distance of depression from the upper surface.

On the other hand, the fine grooves each made of a concave portion shaped like an approximate triangle in section are preferably arranged discontinuously so as to be distributed at random as shown in FIGS. 4 to 6 in order to prevent the fine grooves from being observed conspicuously due to the regularity produced by the set of fine grooves and to prevent moire from being caused by interference of the fine grooves with pixels. If the fine grooves are arranged regularly, moire may occur between the regular arrangement of the fine grooves and the regular arrangement of pixels so that visibility of display light on the liquid-crystal display panel is lowered greatly. When the fine grooves are arranged at random to eliminate the regularity of arrangement, moire can be prevented from occurring.

In order to attain uniformity of light emerging from the whole lower surface (back side) to thereby illuminate the liquid-crystal display panel evenly and in consideration of reduction in intensity of transmitted light with the advance of transmission and emergence of light, it is preferable that the fine grooves A are arranged more densely as they are farther from the light source, that is, as they are farther from the incidence side surface 1c on which the light source is disposed, as shown in FIGS. 4 to 6. This arrangement can prevent unevenness of intensity of emergent light from being caused by attenuation of transmitted light with the advance of transmission and emergence of light.

When the quantity of transmitted light on each of the side end surface sides of the incidence side surface is smaller than that on the center portion of the incidence side surface, it is preferable that the fine grooves A are arranged more densely toward each of the side end surfaces 1e side based on the incidence side surface 1c as shown in FIG. 5 in order to attain uniformity of light emerging from the whole lower surface to thereby illuminate the liquid-crystal display panel evenly. Incidentally, the intensity of transmitted light in places near to the side end surfaces of the optical path control layer is often smaller than that in the center portion of the optical path control layer because of the length of the light source so that the places near to the side end surfaces may be darker than the center portion of the optical path control layer. In this case, the density of the fine grooves to be arranged increases toward the places near to the side end surfaces so that uniformity of intensity of emergent light can be attained. Incidentally, a method in which the fine grooves are arranged more densely as they are farther from the incidence side surface is also used in FIG. 5.

As shown in FIGS. 2 and 3, each of the fine grooves A is formed to have an optical path changing slope A1 inclined at an angle θ1 of from 35 to 48 degrees to the reference plane as described above, that is, to the lower surface 1b in FIGS. 2 and 3, and a steep slope A2 facing the optical path changing slope A1 and inclined at an angle θ2 of not lower than 60 degrees to the lower surface 1b. Moreover, the optical path changing slopes are arranged to face the light source so that light incident on the incidence side surface 1c from the light source can be received by the optical path changing slopes. Hence, light incident on the incidence side surface and transmitted through the optical path control layer can be reflected by the optical path changing slopes A1, so that the reflected light can be made to emerge from the lower surface with good perpendicular directivity.

That is, when, for example, a linear light source such as a cold-cathode tube is used, the maximum intensity of transmitted light is substantially perpendicular to the incidence side surface. When the optical path changing slopes A1 having the inclination angle are arranged so as to be as perpendicular to the vector of the transmitted light as possible while the optical path changing slopes A1 are made to face the incidence side surface, the transmitted light can be reflected or totally reflected by the optical path changing slopes A1 having the inclination angle so that the reflected light can be made to emerge in a direction near to the normal direction to the lower surface effectively. As a result, light can be made to emerge in a direction effective to viewing, so that light reflected by the reflecting layer of the liquid-crystal display panel and given display information is transmitted through other portions than the light output means in the upper surface of the optical path control layer to thereby provide display bright and easy to view. From the point of view of the perpendicular directivity, the preferred inclination angle θ1 of the optical path changing slopes is in a range of from 38 to 45 degrees, especially in a range of from 40 to 43 degrees.

As described above, the optical path changing slopes are generally preferably arranged so as to face the light source as accurately as possible and so as to be as perpendicular to the light source as possible so that light incident on the incidence side surface through the light source can be received by the optical path changing slopes efficiently. Hence, when a linear light source is disposed on the incidence side surface, as shown in FIGS. 4 and 5, it is generally preferable that the optical path changing slopes A1 of the fine grooves A are formed to be parallel on the basis of the direction of the length thereof and that the optical path changing slopes A1 are particularly formed to be as parallel to the incidence side surface 1c as possible. There may be however a case in which arrangement of the optical path changing slopes inclined to the incidence side surface in accordance with the light emission characteristic of the light source is preferably excellent in efficiency of incidence on the optical path changing slopes. Therefore, the light output means may be arranged to be inclined at a suitable angle to the incidence side surface on the basis of the direction of the length thereof.

Incidentally, as shown in FIG. 6, the fine grooves A may be arranged substantially concentrically in the condition that a point light source is used. In such a manner, the optical path of incident light radiated from the light source or the optical path of transmitted light of the incident light is changed by the optical path changing slopes A1 to emit light from the lower surface of the optical path control layer as evenly as possible so that light excellent in directivity in the normal direction to the liquid-crystal display panel is made to emerge from the optical path control layer with good efficiency of utilizing light from the light source. In this case, it is preferable that the fine grooves A are arranged in the form of a substantially concentric arrangement (pit structure) with respect to a virtual center while the position of arrangement of the point light source on the incidence side surface is regarded as the virtual center. Incidentally, it is preferable that the concentric arrangement is performed so that the virtual center is formed on or outside the incidence side surface of the optical path control layer to facilitate the arrangement of the point light source. A virtual center may be formed, or two or more virtual centers may be formed with respect to one incidence side surface or different incidence side surfaces.

On the other hand, the steep slopes A2 facing the optical path changing slopes A1 respectively are provided as surfaces inclined at an angle θ2 of not smaller than 60 degrees to the lower surface because it is preferable that other surfaces than the optical path changing slopes in the light output means have no influence on visual characteristic, light transmission and light emergence as possible. That is, when the steep slopes A2 are formed to face the optical path changing slopes A1 respectively and to be inclined at an angle θ2 of not smaller than 60 degrees to the lower surface, the projected area of the steep slopes A2 viewed in the direction normal to the optical path control layer (in the viewing direction of the display panel) can be reduced so that the influence of the steep slopes on visibility of the liquid-crystal display panel disposed on the back can be reduced when the light source is applied to a front light system.

In terms of external light reflected by the steep slopes A2, as the angle of the steep slopes A2 increases, the intensity of the external light reflected by the steep slopes A2 decreases. Because the reflected light enters the inside of the optical path control layer and is transmitted through the optical path control layer, the influence of the steep slopes A2 on visibility of display light can be reduced advantageously. Incidentally, when, for example, the angle of the steep slopes A2 is not higher than about 45 degrees, the reflected external light returns to the observer's side to thereby disturb visibility of display light.

Figure 2:
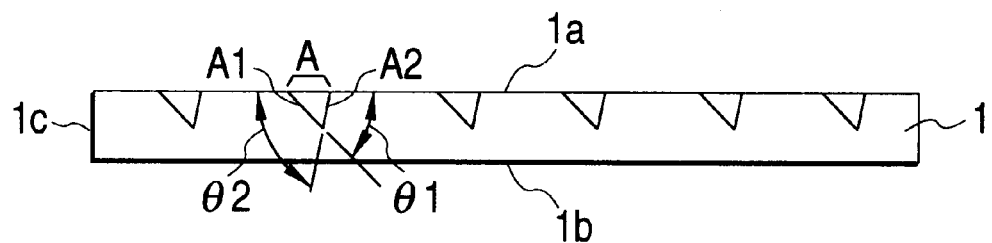
FIG. 2 is aside view for explaining an optical path control layer.

When the angle of the steep slopes A2 is selected to be further higher, the apical angle between a slope A1 and a corresponding steep slope A2 forming a fine groove shaped like an approximate triangle in section as shown in FIG. 2 can become so low that return of the reflected light can be reduced to make the light output means inconspicuous to the observer. The preferred angle θ2 of the steep slopes A2 from the point of view of suppressing the influence of the steep slopes A2 on the visibility is not lower than 75 degrees, especially not lower than 80 degrees. Incidentally, the ideal angle is 90 degrees but, in this case, there is a tendency that the light output means can be hardly formed, for example, by a method of transferring the shape of a mold.

Figure 7:
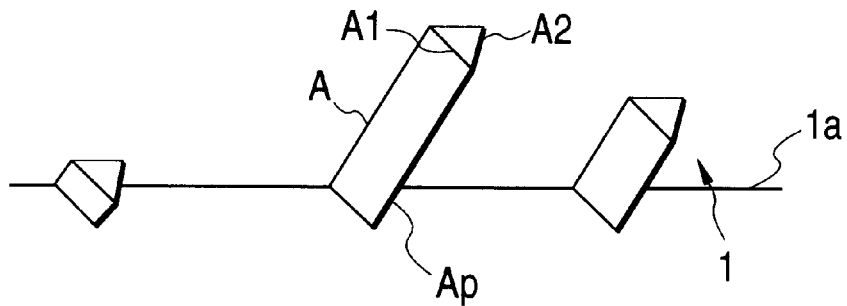
FIG. 7 is a perspective view showing an example of fine grooves.
Figure 8:
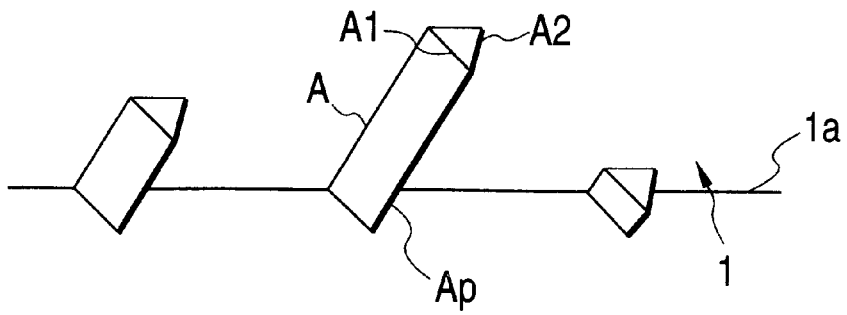
FIG. 8 is a perspective view showing another example of fine grooves.

The optical path changing slopes and the steep slopes may be constituted by straight surfaces as shown in FIG. 7 or may be constituted by curved or bent surfaces in a range satisfying the angle condition as shown in FIG. 8. It is preferable that the apex Ap formed between an optical path changing slope A1 and a corresponding steep slope A2 is as sharp as possible. When the apex is rounded, the radius of the roundness may be preferably selected to be not larger than 30%, especially not larger than 20%, further especially not larger than 10% as large as the depth of the fine groove. In this case, external light reflected by the roundness can be suppressed to make the fine groove inconspicuous and scattering of light transmitted through the optical path control layer can be suppressed to enhance uniformity of emergent light and light output efficiency.

Figure 3:
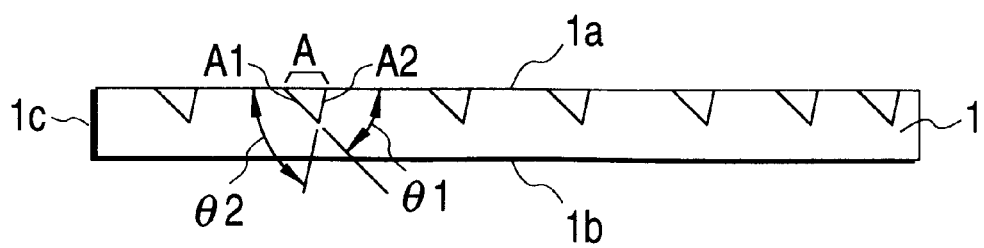
FIG. 3 is a side view for explaining another optical path control layer.

The shape of each side surface of the fine groove is not particularly limited. From the point of view of suppressing incidence of light on the side surface or reducing the influence of the side surface, the side surface is preferably provided as a surface inclined at an angle of not lower than 30 degrees, especially not lower than 45 degrees, further especially not lower than 60 degrees to the lower surface. From the point of view of optical characteristic such as efficiency of incidence of transmitted light and marproofness, each fine groove is formed as a concave portion shaped like an approximate triangle in section and depressed from the upper surface as shown in FIGS. 2 and 3.

From the point of view of reducing the influence of the light output means on light transmitted vertically through the optical path control layer as much as possible to thereby reduce the influence of the light output means on display light of the liquid-crystal display panel when the light source is applied to a front light system, it is preferable that the area occupied by the light output means constituted by the fine grooves is preferably selected to be not larger than ⅛ as large as the area of one surface of the optical path control layer. In the case where a display image of the liquid-crystal display device is observed through the optical path control layer, if the area occupied by the light output means is too large, the quantity of light reflected by the slopes of the light output means increases so that display light can hardly emerge toward the observer. When the area occupied by the light output means is selected to be not larger than ⅛ as large as the area of one surface of the optical path control layer, a large part of the surface of the optical path control layer can be provided as a portion in which the light output means are not formed. In this case, display light of the liquid-crystal display device can be transmitted through this portion efficiently to avoid the problem.

When the ratio of the area of the light output means to the area of the surface of the optical path control layer is reduced in cooperation with the situation that the light output means are constituted by the small-sized fine grooves, the adhesive layer can hardly enter the fine grooves on the occasion where the optical path control layer is bonded to the touch panel through the adhesive layer. This case is advantageous from the point of view of improving light output efficiency from the optical path control layer. The preferred area of the light output means is not larger than ¹⁄₁₀, especially not larger than ¹⁄₁₅ as large as the area of the surface of the optical path control layer.

The optical path control layer can be formed from one kind of a suitable material or from two or more kinds of suitable materials provided in accordance with the wavelength range of the light source and exhibiting transparency to the wavelength range. Incidentally, examples of the materials used in a visible light range are polymers, curable resins and glass as listed in the description for the transparent protective layer. The optical path control layer is preferably made from an optically isotropic material exhibiting no birefringence or small birefringence. Further, the optical path control layer is preferably formed to have a refractive index different by 0.15 or less, especially by 0.10 or less, further especially by 0.05 or less from the refractive index of the transparent substrate in the visual-side cell substrate so that incident light from the light source or transmitted light thereof can be given from the visual-side cell substrate and made incident on the optical path control layer efficiently to thereby achieve bright display through the optical path changing slopes. Especially, the optical path control layer higher in refractive index then the transparent substrate in the visual-side cell substrate is preferred.

The optical path control layer can be formed by a suitable method. The method for forming the optical path control layer is not particularly limited. Preferred examples of the method from the point of view of mass production include: a method in which a thermoplastic resin is hot-pressed against a mold capable of forming predetermined light output means to thereby transfer the shape to the thermoplastic resin; a method in which a mold capable of forming predetermined light output means is filled with a hot-melted thermoplastic resin or with a resin fluidized by heat or through a solvent; a method in which a polymerizing process is performed after a mold capable of forming predetermined light output means is filled with a liquid resin or monomer polymerizable by heat or by ultraviolet rays, electron beams, or radiation rays, or after the liquid resin or monomer is cast in the mold; a method in which such a filled or cast layer is integrated with a transparent film by polymerizing the transparent film while arranging the transparent film closely on the filled or cast layer at that time; and a method in which a coating layer is obtained by applying the liquid resin or monomer on a transparent film, a shape is transferred onto the coating layer by pressing the coating layer against on a mold capable of forming predetermined light output means, and the coating layer of the liquid resin or monomer is then integrated with the transparent film by polymerizing the coating layer after.

Hence, the optical path control layer may be formed by giving its predetermined shape directly to the visual-side cell substrate or may be formed as a transparent sheet having a predetermined shape given in advance. The optical path control layer may be formed as a laminate of parts made from one kind of a material or from different kinds of materials, such as a laminate of a support such as a transparent film and a layer attached to a surface of the support for forming light output means. That is, the optical path control layer need not be formed as an integral single layer body made from one kind of a material. The optical path control layer may contain an anti-reflection layer in its lower surface or may contain a hard coat layer in its upper surface.

The thickness of the optical path control layer is selected to be in a range of from 10 to 300 μm, especially in a range of from 15 to 200 μm, further especially in a range of from 20 to 100 μm, from the point of view of reduction in thickness. Incidentally, when the optical path control layer is formed independently as a transparent sheet, the transparent sheet is preferably bonded to the outer surface side of the visual-side cell substrate in the liquid-crystal display panel through an adhesive layer having a refractive index higher than that of the transparent substrate in the visual-side cell substrate, especially through an adhesive layer having a refractive index as equal to that of the transparent sheet as possible, further especially through an adhesive layer having a refractive index intermediate between that of the transparent sheet and that of the visual-side cell substrate, in order to make incident light from the visual-side cell substrate be incident on the optical path control layer efficiently to thereby achieve bright display. Accordingly, the refractive index of the adhesive layer can be determined in accordance with that of the optical path control layer.

The adhesive layer can be formed from a suitable transparent adhesive agent without any particular limitation in kind. A bonding method using a tacky layer is preferably used for facilitating the bonding process. For forming the tacky layer, there can be used a tackifier containing, as a base polymer, a suitable polymer such as a rubber polymer, an acrylic polymer, a vinyl-alkyl ether polymer, a silicone polymer, a polyester polymer, a polyurethane polymer, a polyether polymer, a polyamide polymer or a styrene polymer. Especially, there can be preferably used a material excellent in transparency, weather resistance and heat resistance, such as an acrylic tackifier containing, as a base polymer, a polymer mainly composed of acrylic or methacrylic alkyl ester.

The optical path control layer is disposed on the visual side of the liquid-crystal display panel. On this occasion, the surface where the light output means A are formed is preferably disposed on the outer side (on the visual side), as shown in FIG. 1, in order to improve luminance on the basis of light-reflecting efficiency by the optical path changing slopes A1 of the light output means A and, accordingly, on the basis of effective utilization of light incident on the side surface.

A transparent touch panel 4 having a mechanism of detecting an input position is bonded to the outer side of the optical path control layer 1 through the transparent adhesive layer 5 to thereby form a reflective liquid-crystal display device, while the optical path control layer 1 has the light output means formed as shown in FIG. 1. A suitable material having a mechanism of detecting an input position and capable of transmitting light vertically can be used as the touch panel. Hence, any one of known transparent touch panels may be used. Generally, the following touch panel can be used. That is, two sheets of transparent base materials provided with transparent electrodes respectively are arranged through a gap while the electrode sides of the two sheets of transparent base materials face each other. Further, input position detecting electrodes for electrically reading an electrode contact position are provided so that the input position can be detected. Incidentally, a transparent base material having flexibility and exhibiting pressure-deformability is used at least as the input side transparent base material which is one of the transparent base materials.

Incidentally, the touch panel 4 shown in FIG. 1 includes: an input side transparent base material 43 provided with a transparent electrode 44; a pressure-receiving side transparent base material 41 provided with a transparent electrode 42; and a spacer 45 through which the two base materials 43 and 41 are arranged with a gap so that the transparent electrode sides of the two base materials 43 and 41 face each other. Though not shown in FIG. 1, resistance value detecting electrodes and lead wires for leading the resistance value detecting electrodes out are provided in the transparent electrodes 42 and 44 respectively.

The touch panel preferably used is a touch panel in which surfaces of the transparent electrodes facing each other may be flat and excellent in smoothness. If the surfaces of the transparent electrodes are concavo-convex, stress is apt to be always applied on a predetermined place in touch inputting operation so that the transparent electrodes may be cracked or peeled off to cause breaking of wires. Particularly when the surface of the pressure-receiving side transparent electrode is provided with prism-like concavo-convex portions for the light output means, stress is apt to be concentrated on the apices of the prism-like concavo-convex portions. In the optical path control layer according to the invention, concavo-convex portions made of fine grooves can be substantially prevented from having an influence on the surface of the transparent electrode in the touch panel. Accordingly, when the surfaces of the transparent electrodes in the touch panel are made flat, stress can be prevented from being concentrated on one place in touch inputting operation. As a result, damage of the electrodes can be lightened so that the life of the touch panel can be prolonged.

The touch panel preferably used from the point of view of easiness in pressure deformation due to flexibility may be a touch panel in which the input side base material is made of a transparent film provided with a transparent electrode. Further, it is preferable that the pressure-receiving side base material in the touch panel is made of a support base material which has an in-plane retardation of not larger than 20 nm, especially not larger than 10 nm and which is provided with a transparent electrode. This is provided for suppressing coloring of emergent light.

That is, when light transmitted through the optical path control layer is reflected in another manner than total reflection, the reflectance may vary in accordance with the direction of vibration of light so that the light may emerge as polarized light from the optical path control layer. In addition, polarized light may be generated by partial reflection in the interface of the adhesive layer through which the optical path control layer and the touch panel are bonded to each other. If such polarized light is made incident on the pressure-receiving side base material in the touch panel to be influenced by the retardation of the pressure-receiving side base material, emergent light may be colored because of color of chromatic polarization. Therefore, when the in-plane retardation of the pressure-receiving side base material is reduced as described above, such coloring can be suppressed as effectively as possible. Incidentally, the in-plane retardation can be obtained by a product of the refractive index difference between the direction of the retarded phase axis and the direction of the advanced phase axis in a plane of the base material and the thickness of the base material.

Similarly to the description made above, from the point of view of preventing emergent light from being colored, it is also preferable that the thickness wise retardation of the support base material in the pressure-receiving side base material as one of constituent members of the touch panel is not larger than 50 nm, especially not larger than 30 nm, further especially not larger than 20 nm. The thicknesswise retardation can be obtained as a value obtained by multiplying the difference between the average in-plane refractive index and the thicknesswise refractive index in the base material by the thickness of the base material.

Incidentally, for use in a touch panel, there is known a transparent base material having a transparent film of PET (polyethylene terephthalate), and a thin film of ITO (indium-tin oxide) formed as a transparent electrode on the transparent film by a vacuum vapor deposition method. In this case, the PET film as a base material may have a very large retardation ranging from a thousand and several hundred nm to several thousand nm. A base material with a small retardation may be formed by a suitable method such as a casting method or may be formed by a method of eliminating optical distortion in an annealing process.

A suitable material as listed above in the description for the optical path control layer may be used for forming each of the transparent base materials in the touch panel. The touch panel may contain an anti-reflection layer in its outermost surface, especially in its visual side outermost surface. The provision of the anti-reflection layer can suppress lowering of contrast of display light due to mirroring of external light. Incidentally, from the point of view of preventing coloring of emergent light, it is preferable that the retardation in the optical path control layer is as small as possible. It is preferable that the optical path control layer has an in-plane retardation of not larger than 20 nm, especially not larger than 10 nm and a thicknesswise retardation of not larger than 50 nm, especially not larger than 30 nm, further especially not larger than 20 nm.

Any suitable light-transmissive layer can be used as the adhesive layer for bonding the optical path control layer and the touch panel to each other. The adhesive layer is not particularly limited. From the point of view of facilitating the bonding process, a tacky layer is preferably used as the adhesive layer. As a tackifier for forming the tacky layer, it is possible to use a suitable one as listed above without any particular limitation. In the condition that the optical path control layer and the touch panel are bonded to each other through the adhesive layer, it is preferable that the inside of the fine grooves A constituting the light output means in the optical path control layer 1 is not filled with the adhesive layer as shown in FIG. 1.

Figure 9:
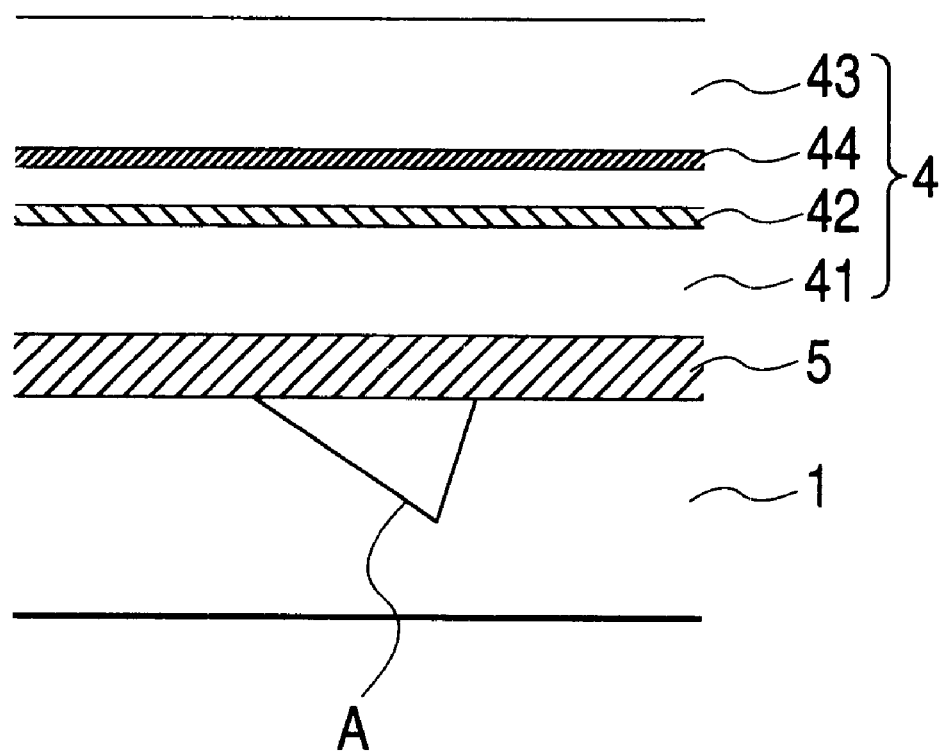
FIG. 9 is an enlarged side view showing a state in which a touch panel is bonded.

That is, as enlarged and shown in FIG. 9, it is preferable that the optical path control layer 1 is bonded to the pressure-receiving side base material 41 of the touch panel 4 through only flat portions other than the fine grooves in the upper surface of the optical path control layer 1 and that the adhesive layer 5 does not enter the inside of the fine grooves A constituting the light output means so that the inside of each of the fine grooves A is filled with air so as to serve as a space as large as possible. This is provided for achieving good light output characteristic while keeping the function of the light output means constituted by the fine grooves as effectively as possible.

If the inside of each of the fine grooves is filled with the adhesive layer, the incident angle range allowing total reflection of the light by the fine grooves is narrowed so that the incidence efficiency is lowered. For this reason, the capacity of changing the optical path of light transmitted through the optical path control layer to the direction of the liquid-crystal display panel is lowered so that illuminating efficiency is apt to be lowered. When the optical path control layer is provided with light output means having a structure in which prism-like concavo-convex portions each with an apical angle of about 135 degrees are disposed adjacently so as to be shaped like stripes, the adhesive layer is apt to enter the light output means on the occasion where the optical path control layer is bonded to the touch panel through the adhesive layer because the apical angle of each prism is wide.

If the adhesive layer enters the light output means, total reflection little occurs because the refractive index difference between the adhesive layer and the optical path control layer is considerably smaller than the refractive index difference between air and the optical path control layer. Total reflection is particularly effective in changing the direction of light at a large angle to thereby make the light travel toward the liquid-crystal display panel. If total reflection hardly occurs, the light output efficiency is lowered greatly to make bright display difficult. In the method of using the light output means constituted by the fine grooves in the optical path control layer according to the invention, penetration of the adhesive layer into the fine grooves can be avoided easily. On the contrary, in the method of using the light output means constituted by a diffusing surface as described in Unexamined Japanese Patent Publication No. 2000-162594, it is almost impossible to perform the bonding process through the adhesive layer while leaving the air layer.

The preferred adhesive layer from the point of view of preventing penetration of the adhesive layer into the fine grooves is an adhesive layer having a large elastic modulus. Especially, the preferred one is an adhesive layer having a storage elastic modulus of not smaller than $5 \times 10^4$ N/m$^2$, especially not smaller than $10^5$ N/m$^2$, further especially not smaller than $10^6$ N/m$^2$ at 20° C. As a result, the adhesive layer can be prevented from entering the fine grooves due to deformation by pressing force at the time of bonding. In consideration of deformation for a long time, an adhesive layer having a large loss elastic modulus is preferably used. In addition, the thickness of the adhesive layer is advantageously selected to be not larger than 25 μm, especially in a range of from 1 to 20 μm, further especially in a range of from 5 to 15 μm in order to keep balance between prevention of penetration of the adhesive layer into the fine grooves and adhesive force. If the adhesive interface is peeled off because of shortage of adhesive force, interfacial reflection increases so that reflectance of external light increases greatly. It is therefore preferable that the bonding process is performed evenly and steadily.

Incidentally, in the case of a tacky layer, the tacky layer may enter the fine grooves easily because the elastic modulus is reduced at a high temperature due to heating. In this case, the tacky layer can be cured by a method of irradiation with ultraviolet rays or electron beams in order to enhance the elastic modulus to thereby attain stability of the elastic modulus. Accordingly, a tacky layer in which the elastic modulus is hardly reduced by heating and a tacky layer in which the elastic modulus is sufficiently large even at a high temperature may be preferably used as the tacky layer.

It is preferable that the adhesive layer has a refractive index lower than that of the optical path control layer and that the refractive index difference between the adhesive layer and the optical path control layer is not smaller than 0.02, especially in a range of from 0.03 to 0.5. As a result, light transmitted through the optical path control layer so as to be incident on the upper surface at a high angle because of high parallelism of the adhesive layer to the upper surface can be totally reflected efficiently so that light leaked from the optical path control layer to the touch panel through the adhesive layer can be reduced as much as possible to thereby reduce the optical influence on the touch panel. Particularly light contributing to illumination for the liquid-crystal display panel is light transmitted through the optical path control layer in parallel to the upper and lower surfaces of the optical path control layer or at an angle near to the parallel. The intensity of the light transmitted at such a high angle is large. Accordingly, when such light is prevented from entering the touch panel, the influence of such light on illumination light can be reduced to suppress lowering of contrast to thereby achieve display easy to view.

From the point of view of the refractive index difference, an acrylic tacky layer is preferably used. On this occasion, if the tacky layer is crosslinkable by radiant rays, a crosslinking process may be performed after bonding to enhance the elastic modulus to thereby improve thermal stability. Incidentally, the bonding process in which the adhesive layer does not enter the fine grooves can be performed by a suitable method such as a method of providing an adhesive layer on the touch panel to bond the touch panel and the optical path control layer to each other through the adhesive layer, and a method of transferring a tacky layer provided on a separator onto the touch panel or onto the optical path control layer to bond the touch panel and the optical path control layer to each other through the tacky layer.

The outer surface of the touch panel may be subjected to a non-glare treatment or an anti-reflection treatment in order to prevent visibility from being disturbed by surface reflection of external light. The non-glare treatment may be done by making the surface as a fine concave-convex structure by various methods such as: a surface roughing method of sandblasting or embossing; and a method of mixing transparent particles of silica. The anti-reflection treatment may be done by a method for forming a coherent vapor-deposited film. Alternatively, the non-glare or anti-reflection treatment may be done by a method for bonding a film to which such a fine concave-convex structure of the surface or such a coherent film is added. The non-glare treatment or the anti-reflection treatment is preferably provided so as not to disturb the function of the light output means as sufficiently as possible.

A light-diffusing layer may be disposed in the reflective liquid-crystal display device. The light-diffusing layer can be provided by a suitable method such as by using a coating layer or a diffusing sheet having a surface of a fine concavo-convex structure in the same manner as that described in the non-glare layer. Although the position of arrangement of the light-diffusing layer can be determined suitably, it is generally preferable from the point of view of stability of display quality that the light-diffusing layer is disposed between the optical path control layer and the visual-side cell substrate as described above. In this case, the light-diffusing layer may be formed as a light diffusing type adhesive layer containing transparent particles so that the light-diffusing layer serves as an adhesive layer for bonding the transparent sheet of the optical path control layer or as an adhesive layer for bonding a polarizer and a phase retarder to each other in order to attain reduction in thickness. Hence, one light-diffusing layer may be disposed or two or more light-diffusing layers may be disposed.

As the transparent particles contained in the adhesive layer, one kind or two kinds of suitable transparent particles may be selected from inorganic particles and organic particles. The inorganic particles may be electrically conductive and are made of silica, alumina, titania, zirconia, tin oxide, indium oxide, cadmium oxide, or antimony oxide. The organic particles are made of a crosslinked or non-crosslinked polymer.

In the reflective liquid-crystal display device according to the invention, a larger part of light incident on the incidence side surface from the light source is transmitted backward through reflection by the liquid-crystal display panel, especially by the transparent substrate in the visual-side cell substrate of the liquid-crystal display panel on the basis of laws of reflection. Hence, while light is prevented from emerging (leaking) from the surface of the panel, the optical path of the light incident on the optical path changing slopes A1 of the optical path control layer is efficiently changed toward the back-side cell substrate with good perpendicular directivity. The other part of the transmitted light is further transmitted backward by total reflection so that the light is made incident on the optical path changing slopes A1 in the back. Hence, the optical path of the other part of the transmitted light is efficiently changed toward the back-side cell substrate with good perpendicular directivity. As a result, bright display can be achieved in an illumination mode. Accordingly, there can be formed a reflective liquid-crystal display device which can use light from the light source or external light efficiently, which is bright, easy to view and excellent in display quality and which can be used both in an external light mode and in an illumination mode.

In the reflective liquid-crystal display device shown in FIG. 1, viewing is performed as follows. In an illumination mode in which the light source 3 is turned on, light α emerging from the lower surface of the optical path control layer 1 passes through the polarizer 27, the liquid-crystal cell 25, etc. and is reflected by the reflecting layer 22. The reflected light passes through the liquid-crystal cell, the polarizer, etc. in the reverse traveling course and reaches the optical path control layer 1. As a result, a display image transmitted through other portions than the fine grooves A is viewed through the touch panel 4. On the other hand, in an external light mode in which the light source is turned off, light incident on the other portions than the fine grooves A in the optical path control layer 1 via the touch panel 4 is transmitted, passes in the reverse traveling course in the manner described above and reaches the optical path control layer 1. As a result, a display image transmitted through the other portions than the fine grooves A in the optical path control layer 1 is viewed through the touch panel 4.

Optical elements or components such as an optical path control layer, a liquid-crystal cell, a polarizer, and a phase retarder for forming the reflective liquid-crystal display device according to the invention may be wholly or partially integrally laminated/fixed onto one another or may be disposed separably. From the point of view of preventing lowering of contrast based on suppression of interfacial reflection, it is preferable that such optical elements or components are fixed onto one another. A suitable transparent adhesive agent such as a tackifier can be used for the fixing/bonding process. A layer of the transparent adhesive agent may be made to contain transparent particles so that the layer is provided as an adhesive layer exhibiting a diffusing function. The optical elements or components, especially the visual-side optical elements or components may be made to have ultraviolet light absorptive power, for example, by a method of treatment with an ultraviolet light absorbent such as a salicylate compound, a benzophenol compound, a benzotriazole compound, a cyanoacrylate compound or a nickel complex salt.

REFERENCE EXAMPLE 1

A chromium mask was formed as follows. Openings each 100 μm long and 10 μm wide were provided in a 35 mm×25 mm rectangular region of a glass substrate so that the direction of short sides of the rectangular region was parallel with the direction of the length of each of the openings. Incidentally, the openings were disposed so at random that the density of the openings increased gradually from one short side of the rectangular region to the other short side thereof, that is, the density of the openings increased continuously in a direction of each long side of the rectangular region (FIG. 4). The total area occupied by the openings was selected to be not larger than 1/10 as large as the area of the rectangular region.

On the other hand, polyimide varnish was applied onto a clean glass plate by spin coating. After pre-baked at 100° C. for 30 minutes, the polyimide varnish was sintered at 350° C. for 4 hours. Thus, a polyimide coating film 10 μm thick was formed on the clean glass plate. Then, a chromium film 0.1 μm thick and a copper film 0.5 μm thick were successively formed on the polyimide coating film by a sputtering method. A positive resist 5 μm thick was applied onto a surface of the copper film by spin coating. In this manner, a sample plate was produced.

The chromium mask was disposed closely on the positive resist of the sample plate. After exposure by ultraviolet rays, the resist was developed. Then, the copper film and the chromium film were removed by etching. Thus, a sample plate having the polyimide coating film exposed at is opening portions was obtained. The sample plate was irradiated with a laser beam while a parallel excimer laser was scanned by a large number of times in the condition that the sample plate was set so that the short side of the sample plate sparse in the density of the openings was perpendicular to the direction of traveling of the laser beam whereas the long side thereof was inclined at 43 degrees to the laser beam. In this manner, the polyimide coating film in the respective opening portions was partially removed by ablation. Then, the copper film and the chromium film in the sample plate were removed by etching. Then, a silver thin film was applied on the sample plate by vacuum vapor deposition. The sample plate was nickel typed and cut into a predetermined shape. Thus, a mold A was obtained.

REFERENCE EXAMPLE 2

A mold B was obtained in the same manner as in Reference Example 1 except that the sample plate was replaced by a sample plate (FIG. 5) having openings disposed on a rectangular region at random so that the density of arrangement of the openings increased continuously in a direction of each long side of the rectangular region and so that the density in portions nearer to each long side became higher than the density in portions nearer to the center of the rectangular region.

REFERENCE EXAMPLE 3

A surface of a rectangular brass plate begun to be cut at a position far by 2.5 mm from the incidence side surface by a diamond tool. Thus, there was obtained a mold C having stripe-like light output means disposed at intervals of 210 μm and each shaped like a scalene triangle in section. The direction of cutting was selected to be parallel to the direction of the length of the brass plate. Each of the light output means had an optical path changing slope 20 μm wide and inclined at an angle of 42 degrees, and a gentle slope 190 μm wide. The optical path changing slopes faced the incidence side surface. The area occupied by the optical path changing slopes was selected to be 1/10.5 as large as the area of the upper surface.

REFERENCE EXAMPLE 4

A surface of a rectangular brass plate was sandblasted to thereby obtain a mold D having a delustered surface as a surface for forming the light output means.

REFERENCE EXAMPLE 5

A mold E was obtained in the same manner as in Reference Example 1 except that the sample plate was irradiated with a laser beam while a parallel excimer laser was scanned by a large number of times in the condition that the sample plate was set so that the short side of the sample plate sparse in the density of the openings was perpendicular to the laser beam, so that the polyimide coating film was partially removed by ablation. That is, the mold E had no surface allowing the optical path changing slopes to be formed at a predetermined angle.

EXAMPLE 1

An ultraviolet-curable acrylic resin was applied onto a transparent norbornene resin film 100 μm thick. The coating of the resin film was quietly put on the mold A obtained in Reference Example 1. After the resin film and the mold A were made to adhere closely to each other by a rubber roller so that surplus resin and air bubbles were extruded, the resin film was irradiated with ultraviolet rays by a metal halide lamp so as to be cured. Then, the cured resin film was separated from the mold A and cut into a size 40 mm wide and 30 mm long. Thus, an optical path control layer A having the cured layer to which the negative shape of the mold A was transferred was obtained. Incidentally, the refractive index of the norbornene resin film was 1.52 and the refractive index of the cured layer was 1.512. According to the result of observation of a section by an SEM (scanning electron microscope), the optical path control layer obtained thus was provided with light output means constituted by fine grooves each made of a concave portion shaped like an approximate triangle in section. Each of the fine grooves had an optical path changing slope inclined at an angle of about 42 degrees, and a steep slope inclined at an average angle of about 70 degrees. The other portions than the light output means in the optical path control layer were flat portions. Hence, the shape of the light output means was formed by transference of the negative shape of the mold A.

An ITO thin film was provided on a surface of the norbornene resin film by a vacuum vapor deposition method to thereby form a transparent electrode. The sheet resistance of the thin film obtained thus was 400 Ω/□. The film was cut into a size 40 mm wide and 30 mm long so that two sheet of the films were prepared. In each of the two film sheets, long sides and short sides were printed with silver paste to thereby form an electrode. Then, a transparent resin spacer was formed between the two film sheets. The peripheries of the two film sheets were bonded to each other by a double-coated tape while the electrodes were made to face each other through the spacer. Thus, a touch panel A was obtained. According to the measurement of the retardation of the film, the in-plane retardation was 12 nm and the thicknesswise retardation was 35 nm.

The optical path control layer A was bonded to the visual side of a reflective liquid-crystal display panel through a tacky layer having a refractive index of 1.515 so that the light output means of the optical path control layer A were disposed on the visual side. Incidentally, the reflective liquid-crystal display panel had a reflective electrode on the liquid-crystal side of the back-side cell substrate, a low-refractive-index transparent layer on the liquid-crystal side of the visual-side cell substrate, and a phase retarder and a polarizer on the upper side of the visual-side cell substrate. Then, the touch panel A was bonded onto the optical path control layer through an acrylic tackifier having a refractive index of 1.468. A cold-cathode tube was disposed on a side surface of the visual-side cell substrate which faced the optical path changing slopes of the fine grooves in the optical path control layer. Thus, a reflective liquid-crystal display device was obtained. Incidentally, the storage elastic modulus of the acrylic tackifier was $1.8 \times 10^5$ N/m² at 20° C.

EXAMPLE 2

An optical path control layer B was obtained in the same manner as in Example 1 except that the mold B obtained in Reference Example 2 was used. A reflective liquid-crystal display device was obtained in the same manner as in Example 1 except that the optical path control layer A was replaced by the optical path control layer B. According to the result of observation of a section by an SEM, the light output means of the optical path control layer B were constituted by fine grooves each made of a concave portion shaped like an approximate triangle in section and formed by transference of the negative shape of the mold B. Each of the light output means had an optical path changing slope inclined at an angle of about 41 degrees, and a steep slope inclined at an average angle of about 72 degrees.

EXAMPLE 3

An optical path control layer C was obtained in the same manner as in Example 1 except that the mold C obtained in Reference Example 3 was used. A reflective liquid-crystal display device was obtained in the same manner as in Example 1 except that the optical path control layer A was replaced by the optical path control layer C. According to the result of observation of a section by an SEM, the light output means of the optical path control layer C were formed in a repetitive structure of prism-like concavo-convex portions each made of a concave portion shaped like an approximate triangle in section and formed by transference of the negative shape of the mold C. There was no flat portion in the optical path control layer C. Each of the light output means had an optical path changing slope inclined at an angle of about 42 degrees, and a gentle slope inclined at an average angle of about 3 degrees.

EXAMPLE 4

An optical path control layer D was obtained in the same manner as in Example 1 except that the mold D obtained in Reference Example 4 was used. A reflective liquid-crystal display device was obtained in the same manner as in Example 1 except that the optical path control layer A was replaced by the optical path control layer D. According to the result of observation of a section by an SEM, the light output means of the optical path control layer D were constituted by random concavo-convex portions formed by transference of the negative shape of the mold D.

EXAMPLE 5

An optical path control layer E was obtained in the same manner as in Example 1 except that the mold E obtained in Reference Example 5 was used. A reflective liquid-crystal display device was obtained in the same manner as in Example 1 except that the optical path control layer A was replaced by the optical path control layer E. According to the result of observation of a section by an SEM, each of the light output means in the optical path control layer E was constituted by a nearly rectangular trapezoid in section and formed by transference of the negative shape of the mold E. The angle between a slope and an opposite face in each of the light output means was about 80 degrees.

EXAMPLE 6

A reflective liquid-crystal display device was obtained in the same manner as in Example 1 except that the optical path control layer A and the touch panel A were bonded to each other through an acrylic tackifier having a refractive index of 1.468 and a storage elastic modulus of $3 \times 10^4$ N/m² at 20° C.

EXAMPLE 7

A reflective liquid-crystal display device was obtained in the same manner as in Example 1 except that the touch panel A was bonded to a 0.7 mm-thick glass substrate through a tackifier and simply stacked on the optical path control layer A without interposition of any acrylic tackifier.

EXAMPLE 8

A reflective liquid-crystal display device was obtained in the same manner as in Example 1 except that the touch panel A was replaced by a touch panel B. Incidentally, the touch panel B was produced by use of a PET film having an in-plane retardation of 1,780 nm and a thicknesswise retardation of 3,400 nm in place of the norbornene resin film used in the touch panel A.

EXAMPLE 9

A reflective liquid-crystal display device was obtained in the same manner as in Example 1 except that the optical path control layer A and the touch panel A were replaced by a light pipe and a touch panel C so that the combination of the light pipe and the touch panel C bonded to each other through a tacky layer was simply stacked on a liquid-crystal display panel, and so that a cold-cathode tube was disposed on a side surface of the light pipe. Incidentally, the light pipe was produced of a 1.2 mm-thick acrylic plate which was cut into a size 40 mm wide and 30 mm long and which had end surfaces polished. The touch panel C was produced in the same manner as the touch panel A except that a norbornene resin film having light output means constituted by random concavo-convex portions was formed by use of the mold D instead of the mold C, provided with an ITO thin film formed on the light output means, and cut into a size 40 mm wide and 30 mm long so as to be used as the pressure-receiving side base material.

Evaluation Test

The reflective liquid-crystal display device obtained in each of Examples 1 to 9 was observed in a frontal direction in a dark room while the cold-cathode tube in the display device was turned on so that a half of the liquid-crystal display panel was in a white state and the other half was in a black state. In addition, luminance in the center of the white display portion was measured. Results of the measurement were as shown in the following Table.

| | Ex 1 | Ex 2 | Ex 3 | Ex 4 | Ex 5 | Ex 6 | Ex 7 | Ex 8 | Ex 9 |
| --- | --- | --- | --- | --- | --- | --- | --- | --- | --- |
| Frontal Luminance (cd/m²) | 46 | 41 | 15 | 3 | 10 | 23 | 57 | 41 | 21 |

It was apparent from the results that high luminance was achieved in each of Examples 1 and 2. As results of microscopic observation, an air layer substantially equal to each of the groove portions was observed in each of Examples 1 and 2. It was also apparent that the light output means were not filled with any tacky layer in each of Examples 1 and 2. Moreover, the state of light emerging from the lower surface was observed. As a result, the light emerged intensively in a direction approximately perpendicular to the panel. It was found that the luminance was high and the reflective liquid-crystal display device could be illuminated effectively. In addition, the display device was excellent in blackness and high in contrast even in the black state.

On the other hand, luminance in Example 3 was about ⅓ as high as that in each of Examples 1 and 2. According to the microscopic observation of Example 3, it was found that a large number of grooves were filled with a tacky layer. This observation result was conceived to be caused for the following reason. That is, because the angle between opposite surfaces of each of the light output means was shallow, glue entered the grooves to reduce the area of slopes allowing total reflection, to thereby make the luminance low. Further, moiré was generated between the light output means and the pixels so that display was not easy to view. In Example 4, it was found that light little emerged. According to the result of microscopic observation of Example 4, the concavo-convex portions of the optical path control layer were entirely filled with a tacky layer. As a result, bright display could not be obtained even in the white state and contrast was low so that distinction between the black state and the white state was difficult.

In Example 5, light emerged obliquely at a large angle, so that frontal luminance was very low compared with that in each of Examples 1 and 2. According to the observation of the light emerging at a large angle, contrast between the white display portion and the black display portion was very low, so that a large part of the light did not contain display information. According to the microscopic observation, the light output means in Example 5 were little filled with a tacky layer. It was, however, conceived that the liquid-crystal display device could not be illuminated effectively because the angle of slopes was too large to obtain total reflection of transmitted light compared with Examples 1 and 2.

Luminance in Example 6 was about ½ as high as that in each of Examples 1 and 2. Moreover, a large part of light in Example 6 emerged obliquely at a large angle compared with each of Examples 1 and 2. According to the result of microscopic observation, it was found that the tacky layer entered the groove structure of the light output means because the area of the interface of the light output means with air was small compared with each of Examples 1 and 2. In Example 7, luminance was higher than that in each of Examples 1 and 2, but the liquid-crystal display device was not easy to use because large flexure was generated when the touch panel was not supported to a glass plate. When the touch panel was therefore attached to a glass plate, the thickness of the liquid-crystal display device increased by about 1 mm compared with that in each of Examples 1 and 2.

Luminance in Example 8 was approximately equivalent to that in each of Examples 1 and 2. In Example 8, however, display was not easy to view because a portion with rainbow unevenness or low luminance was observed in the touch panel as the viewing angle was made to fall down. Luminance in Example 9 was about ½ as high as that in each of Examples 1 and 2. In Example 9, a large part of light emerged obliquely at a large angle. Moreover, light leaked from the upper surface was intensive and contrast was low. In addition, the thickness of the liquid-crystal display device increased by about 1.5 mm compared with that in each of Examples 1 and 2.

On the other hand, contrast was evaluated in an external light mode in the condition that a white state and a black state were displayed half by half in a bright room with the light source turned off. As a result, display in each of Examples 1, 2, 4, 5 and 6 was very good and easy to view. On the contrary, display in Example 3 was not easy to view because of occurrence of moire. In Example 7, display was not easy to view because black display was made whitish by generation of an image mirrored due to reflection in the lower surface of the touch panel and in the front surface of the liquid-crystal display device. In Example 8, display was not easy to view because rainbow unevenness caused by the touch panel was observed in accordance with the viewing angle. Also in Example 9, display was not easy to view because black display was made whitish by generation of an image mirrored due to reflection in the lower surface of the light pipe and in the front surface of the liquid-crystal display device in the same manner as in Example 7.

Then, the liquid-crystal display device obtained in each of Examples 1, 2 and 9 was subjected to a touch input test on one place by use of a weight of 50 g having a semispherical forward end with a diameter of 5 mm. As a result, current conduction was obtained even in a test of 20,000 times in each of Example 1 and 2 whereas current conduction was not obtained in a test of 9,000 times in Example 9 because of breaking of wires.

It is obvious from these results that Examples 1 and 2 are particularly superior all in brightness at the time of turning on the light source, in contrast of display, in easiness to view and in the life of the touch panel. Hence, it is obvious that a reflective liquid-crystal display device free from moire, bright and easy to view can be obtained according to the invention.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A reflective liquid-crystal display device comprising:
   a reflective liquid-crystal display panel including a liquid-crystal cell and light-reflecting means, said liquid-crystal cell having a back-side cell substrate made of a support substrate containing at least an electrode, a visual-side cell substrate made of a transparent substrate containing at least a transparent electrode, and a layer of liquid crystal between the two cell substrates disposed so that the electrode sides of the two cell substrates face each other, said light-reflecting means being located on a back side with respect to said liquid-crystal layer of said cell, said reflective liquid-crystal display panel being formed in a manner such that external light incident on an outer surface of said visual-side cell substrate is reflected by said light-reflecting means so that display light transmitted through said liquid-crystal layer is made to emerge from said visual-side cell substrate and viewed;
   at least one light source disposed on at least one of side surfaces of said reflective liquid-crystal display panel;
   an optical path control layer having a thickness in a range of from 10 to 300 μm and disposed on an outer surface side of said visual-side cell substrate, said optical path control layer including light output means formed by arrangement of a plurality of fine grooves each made of a concave portion shaped like an approximate triangle in section, each of said fine grooves being having a length of not larger than 250 μm and a depth of not larger than 50 μm, the depth being not larger than ⅕ as large as the length, each of said fine grooves having an optical path changing slope, and a steep slope facing said optical path changing slope, said optical path changing slopes being provided so that light incident on said side surface from said light source is reflected toward said back-side cell substrate side, each of said optical path changing slopes being inclined at an inclination angle in a range of from 35 to 48 degrees to a reference plane of said liquid-crystal display panel, each of said steep slopes being inclined at an inclination angle of not lower than 60 degrees to said reference plane;

a transparent adhesive layer; and a transparent touch panel provided with a mechanism for detecting an input position and bonded to an outer side of said optical path control layer through said transparent adhesive layer.

2. A reflective liquid-crystal display device according to claim 1, wherein said visual-side cell substrate further contains a transparent layer lower in refractive index than that of said transparent substrate and disposed between said transparent substrate and said transparent electrode.

3. A reflective liquid-crystal display device according to claim 1, wherein each of said visual-side cell substrate and said back-side cell substrate is made of an optically isotropic material.

4. A reflective liquid-crystal display device according to claim 1, wherein an area occupied by said light output means is not larger than ⅛ as large as an area of one surface of said optical path control layer.

5. A reflective liquid-crystal display device according to claim 1, wherein each of said optical path changing slopes in said optical path control layer is inclined at an inclination angle in a range of from 38 to 45 degrees to said reference plane of said liquid-crystal display panel.

6. A reflective liquid-crystal display device according to claim 1, wherein said fine grooves constituting said light output means are arranged to be distributed at random in one surface of said optical path control layer.

7. A reflective liquid-crystal display device according to claim 1, wherein said fine grooves constituting said light output means in said optical path control layer are arranged more densely as they are farther from said light source.

8. A reflective liquid-crystal display device according to claim 1, wherein said fine grooves constituting said light output means in said optical path control layer are arranged more densely as they are nearer to each of side end surfaces based on said side surface on which said light source is disposed.

9. A reflective liquid-crystal display device according to claim 1, wherein said optical path control layer is made of a transparent film coated with a layer for forming said light output means.

10. A reflective liquid-crystal display device according to claim 1, wherein said optical path control layer is made of an optically isotropic material.

11. A reflective liquid-crystal display device according to claim 1, wherein: said light source disposed on said side surface of said liquid-crystal display panel is made of a linear light source; and said fine grooves constituting said light output means are arranged in parallel to one another in terms of said optical path changing slopes.

12. A reflective liquid-crystal display device according to claim 1, wherein: said light source disposed on said side surface of said liquid-crystal display panel is made of a point light source; and said fine grooves constituting said light output means are arranged concentrically with said point light source as a virtual center.

13. A reflective liquid-crystal display device according to claim 1, wherein said reflective liquid-crystal display panel further includes at least one polarizer disposed on at least one surface of said liquid-crystal cell.

14. A reflective liquid-crystal display device according to claim 13, wherein said reflective liquid-crystal display panel further includes a phase retarder between said liquid-crystal cell and said polarizer.

15. A reflective liquid-crystal display device according to claim 1, wherein said touch panel includes an input side transparent base material containing a transparent electrode, and a pressure-receiving side transparent base material containing a transparent electrode and disposed opposite to said input side transparent base material so that the respective transparent electrodes of the two base materials face each other through a gap.

16. A reflective liquid-crystal display device according to claim 15, wherein said input side base material as one of constituent members of said touch panel is constituted by a transparent film containing a transparent electrode.

17. A reflective liquid-crystal display device according to claim 15, wherein said pressure-receiving side base material as one of constituent members of said touch panel is constituted by a support base material having an in-plane retardation of not larger than 20 nm and containing a transparent electrode.

18. A reflective liquid-crystal display device according to claim 15, wherein said pressure-receiving side base material as one of constituent members of said touch panel is constituted by a support base material having a thickness-wise retardation of not larger than 50 nm and containing a transparent electrode.

19. A reflective liquid-crystal display device according to claim 1, wherein said touch panel further includes an anti-reflection layer in its outermost surface.

20. A reflective liquid-crystal display device according to claim 1, wherein said adhesive layer for bonding said optical path control layer and said touch panel to each other is a tacky layer.

21. A reflective liquid-crystal display device according to claim 1, wherein said adhesive layer for bonding said optical path control layer and said touch panel to each other is formed so that said fine grooves constituting said light output means in said optical path control layer are not filled with said adhesive layer.

22. A reflective liquid-crystal display device according to claim 1, wherein said adhesive layer for bonding said optical path control layer and said touch panel to each other has a refractive index lower than that of said optical path control layer so that a refractive index difference between said adhesive layer and said optical path control layer is not lower than 0.02.

23. A reflective liquid-crystal display device according to claim 1, wherein said adhesive layer for bonding said optical path control layer and said touch panel to each other exhibits a storage elastic modulus of not smaller than $5 \times 10^4$ N/m$^2$ at 20° C.

* * * * *